United States Patent
Nakahata et al.

(10) Patent No.: US 8,158,018 B2
(45) Date of Patent: Apr. 17, 2012

(54) FERRITE SINTERED BODY AND MANUFACTURING METHOD THEREFOR

(75) Inventors: Isao Nakahata, Tokyo (JP); Tomokazu Ishikura, Tokyo (JP); Takuya Aoki, Tokyo (JP)

(73) Assignee: TDK Corporation, Chuo-ku, Tokyo (JP)

( * ) Notice: Subject to any disclaimer, the term of this patent is extended or adjusted under 35 U.S.C. 154(b) by 469 days.

(21) Appl. No.: 12/408,842

(22) Filed: Mar. 23, 2009

(65) Prior Publication Data

US 2009/0242827 A1  Oct. 1, 2009

(30) Foreign Application Priority Data

Mar. 25, 2008  (JP) ............................... P2008-078532

(51) Int. Cl.
  *H01F 1/34* (2006.01)
(52) U.S. Cl. .................. 252/62.62; 252/62.59
(58) Field of Classification Search .............. 252/62.62, 252/62.59
  See application file for complete search history.

(56) References Cited

U.S. PATENT DOCUMENTS 6,905,629 B2   6/2005 Sezai et al.

FOREIGN PATENT DOCUMENTS

| JP | 2004-35372 | | 2/2004 |
|---|---|---|---|
| JP | 2004-035372 | * | 2/2004 |
| JP | 2005-119892 | | 5/2005 |
| JP | 2006-44971 | | 2/2006 |
| JP | 2006-213532 | | 8/2006 |

* cited by examiner

*Primary Examiner* — Carol M Koslow

(74) *Attorney, Agent, or Firm* — Drinker Biddle & Reath LLP

(57) ABSTRACT

The ferrite sintered body of the present invention contains main components consisting of 52 to 54 mol % $Fe_2O_3$, 35 to 42 mol % MnO and 6 to 11 mol % ZnO as oxide equivalents and additives including Co, Ti, Si and Ca in specified amounts, and has a temperature at which the power loss is a minimal value (bottom temperature) of higher than 120° C. in a magnetic field with an excitation magnetic flux density of 200 mT and a frequency of 100 kHz, and a power loss of 350 $kW/m^3$ or less at the bottom temperature.

5 Claims, 4 Drawing Sheets

FERRITE SINTERED BODY AND MANUFACTURING METHOD THEREFOR

BACKGROUND OF THE INVENTION

1. Field of the Invention

The present invention relates to a ferrite sintered body containing main components including Fe, Mn and Zn together with additives including Co, Ti, Si and Ca, and to a manufacturing method therefor.

2. Related Background Art

Ferrite sintered bodies are used as magnetic core materials in power transformers and the like. The ferrite sintered body forming a magnetic core is called a ferrite core, and Mn-Zn ferrite containing Mn and Zn is widely used. In order to reduce the amount of heat generated when the device is used, the power loss value of the ferrite core should be small across a broad temperature range (see Japanese Patent Application Laid-open No. 2005-119892). The power loss of the core is called the "core loss".

Conventional power transformers and other devices are designed to perform at operating temperatures around 50 to 70° C., and the temperature at which power loss is minimized (hereunder called the "bottom temperature") is 80 to 100° C. for the materials of commonly used ferrite cores. If the operating temperature of the device is lower than the bottom temperature, thermal runaway is prevented from occurring because the amount of heat generated declines gradually even if the temperature of the ferrite core rises gradually during use.

However, electronic devices and power sources have gotten smaller in recent years, and there has been strong demand for thinner and smaller transformer cores because these occupy a large amount of parts volume. Higher parts densities have also been achieved in the field of electronics. Under these circumstances, the temperature tends to rise more due to heat generation, and the temperature of the ferrite core also tends to be higher. To answer demands for higher operating temperature of electronic devices, various investigations for ferrite materials were performed (see for example Japanese Patent Application Laid-open No. 2004-35372, Japanese Patent Application Laid-open No. 2006-213532, Japanese Patent Application Laid-open No. 2006-44971).

SUMMARY OF THE INVENTION

However, conventional ferrite sintered bodies are not always adaptable to higher operating temperatures in transformer power sources and the like, and there is room for improvement from the standpoint of reliably preventing thermal runaway of the device.

Under these circumstances, it is an object of the present invention to provide a ferrite sintered body suited to use under high-temperature conditions whereby thermal runaway can be adequately prevented, as well as a manufacturing method therefor.

The ferrite sintered body of the present invention contains main components consisting of 52 to 54 mol % $Fe_2O_3$, 35 to 42 mol % MnO and 6 to 11 mol % ZnO as oxide equivalents, and additives including Co, Ti, Si and Ca in the amounts shown in (1) to (4) below per each 1 part by mass of the total mass of the aforementioned oxides of the main components, and has a bottom temperature greater than 120° C. and a power loss of 350 kW/m$^3$ or less at the bottom temperature in a magnetic field with an excitation magnetic flux density of 200 mT and a frequency of 100 kHz.

(1) Co in an amount corresponding to $1000 \times 10^{-6}$ to $3500 \times 10^{-6}$ parts by mass as CoO equivalent, (2) Ti in an amount corresponding to $2000 \times 10^{-6}$ to $5000 \times 10^{-6}$ parts by mass as $TiO_2$ equivalent, (3) Si in an amount corresponding to $50 \times 10^{-6}$ to $150 \times 10^{-6}$ parts by mass as $SiO_2$ equivalent, (4) Ca in an amount corresponding to $300 \times 10^{-6}$ to $1500 \times 10^{-6}$ parts by mass as $CaCO_3$ equivalent.

The temperature (bottom temperature) at which the power loss of this ferrite sintered body is minimized is higher than 120° C., and the power loss at the bottom temperature is 350 kW/m$^3$ or less. Thus, with a magnetic core consisting of this ferrite sintered body the amount of heat generated can be adequately reduced even under high-temperature conditions of about 100° C. or even higher, and thermal runaway can be adequately prevented.

In the ferrite sintered body of the present invention, the additives preferably further include Nb and/or Ta in the amounts shown in (5) and (6) below per each 1 part by mass of the total mass of the aforementioned oxides of the main components.

(5) Nb in an amount corresponding to $50 \times 10^{-6}$ to $600 \times 10^{-6}$ parts by mass as $Nb_2O_5$ equivalent, (6) Ta in an amount corresponding to $80 \times 10^{-6}$ to $1000 \times 10^{-6}$ parts by mass as $Ta_2O_5$ equivalent.

When the ferrite sintered body of the present invention is one that includes Nb and/or Ta in the amounts given in (5) and (6) above as additives, the uniformity of the crystal structure of the ferrite sintered body is improved, and power loss is faker reduced.

In the ferrite sintered body of the present invention, the additives preferably further include Zr and/or Hf in the amounts shown in (7) and (8) below per each 1 part by mass of the total mass of the aforementioned oxides of the main components.

(7) Zr in an amount corresponding to $200 \times 10^{-6}$ parts by mass or less as $ZrO_2$ equivalent, (8) Hf in an amount corresponding to $400 \times 10^{-6}$ parts by mass or less as $HfO_2$ equivalent.

The Zr and Hf in the ferrite sintered body are components that help to increase the resistance of the grain boundaries. Thus, when the ferrite sintered body of the present invention includes Zr and/or Hf in the amounts given in (7) and (8) above as additives, power loss under high temperature conditions is further reduced.

The method for manufacturing the ferrite sintered body of the present invention has a step of mixing main components consisting of 52 to 54 mol % $Fe_2O_3$, 35 to 42 mol % MnO and 6 to 11 mol % ZnO as oxide equivalents with additives including Co, Ti, Si and Ca in the amounts shown in (1) to (4) above per 1 part by mass of the total mass of the oxides of the main components, and a main firing step wherein a ferrite sintered body is obtained by firing a powder containing the aforementioned main components and aforementioned additives in a furnace, with this main firing step having a temperature-holding step in which the firing temperature is maintained at 1250 to 1345° C. and an oxygen concentration adjustment step in which the oxygen concentration inside the furnace is lowered either continuously or in stages as the temperature drops from the holding temperature, so that by means of the oxygen concentration adjustment step, the oxygen concentration at 1250° C. is made to be 0.24 to 2.0 vol % while the oxygen concentration at 1100° C. is made to be 0.020 to 0.20 vol %.

With this ferrite sintered body manufacturing method, it is possible to effectively manufacture a ferrite sintered body with a bottom temperature higher than 120° C. and a power loss of 350 kW/m³ or less at the bottom temperature. Moreover, with a magnetic core made of a ferrite sintered body obtained by this manufacturing method it is possible to satisfactorily reduce the amount of heat generated even at about 100° C. or under even higher temperature conditions, and to satisfactorily prevent thermal runaway.

In the present invention, the "temperature at which power loss is mnimized (bottom temperature)" is the temperature at which the power loss reaches a minimal value within a temperature range of 25 to 150° C. in a magnetic field with an excitation magnetic flux density of 200 mT and a frequency of 100 kHz, and the power loss at this temperature range is the value measured with a SY-8232 B-H analyzer (brand name, Iwatsu Electric Co., Ltd.).

The present invention provides a ferrite sintered body whereby the occurrence of thermal runaway can be prevented and which is suited to use under high-temperature conditions, along with a manufacturing method therefor.

DESCRIPTION OF THE PREFERRED EMBODIMENTS

Embodiments of the present invention are explained in detail below.

Figure 1:
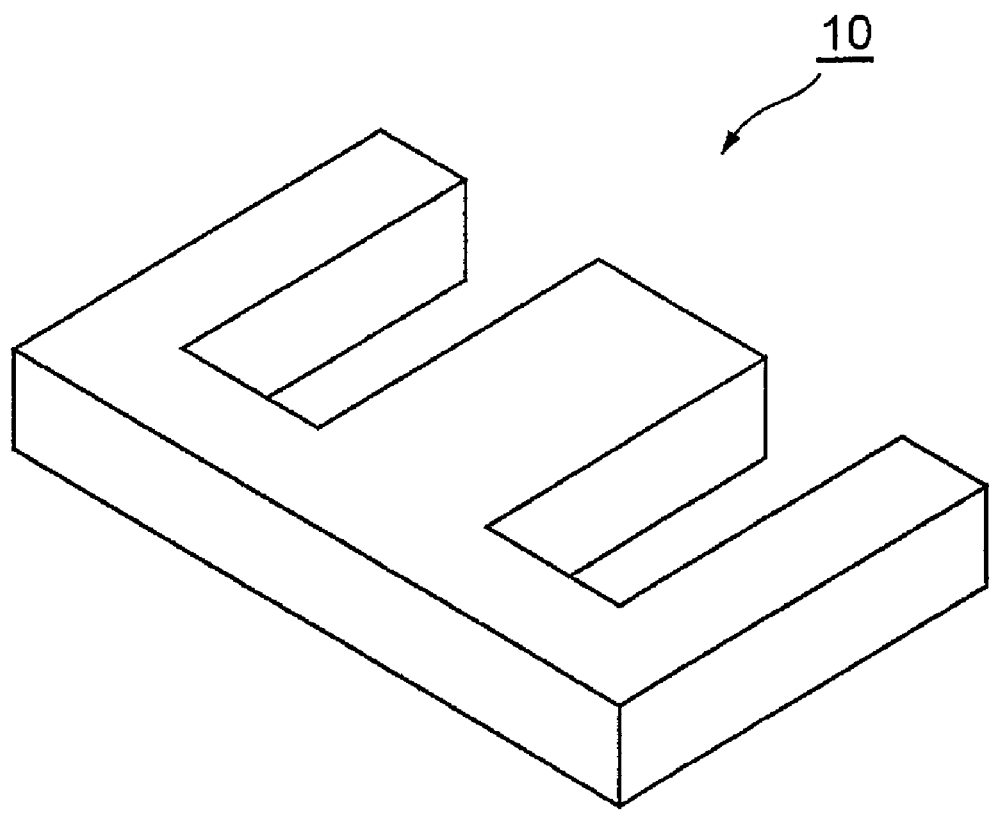
FIG. 1 is a perspective view of a ferrite core consisting of the ferrite sintered body of the present invention.

FIG. 1 is a perspective view of a ferrite core (magnetic core) consisting of the ferrite sintered body of the present invention. As shown in FIG. 1, E-shaped ferrite core 10 is called the E-shaped core or the like, and is used for transformers and the like. A transformer using an E-shaped core such as ferrite core 10 might be a transformer containing two internal E-shaped cores arranged facing one another.

Ferrite Sintered Body

Ferrite core 10 is composed of a ferrite sintered body, and this ferrite sintered body contains main components including Fe, Mn and Zn, along with additives including Co, Ti, Si and Ca. The main components of the ferrite sintered body consist of 52 to 54 mol % $Fe_2O_3$, 35 to 42 mol % MnO and 6 to 11 mol % ZnO, as oxide equivalents. The additives of the ferrite sintered body include Co, Ti, Si and Ca in the amounts shown in (1) to (4) below per each 1 part by mass of the total mass of the aforementioned oxides of the main components.

(1) Co in an amount corresponding to $1000 \times 10^{-6}$ to $3500 \times 10^{-6}$ parts by mass as CoO equivalent,
(2) Ti in an amount corresponding to $2000 \times 10^{-6}$ to $5000 \times 10^{-6}$ parts by mass as $TiO_2$ equivalent,
(3) Si in an amount corresponding to $50 \times 10^{-6}$ to $150 \times 10^{-6}$ parts by mass as $SiO_2$ equivalent,
(4) Ca in an amount corresponding to $300 \times 10^{-6}$ to $1500 \times 10^{-6}$ parts by mass as $CaCO_3$ equivalent.

Figure 2:
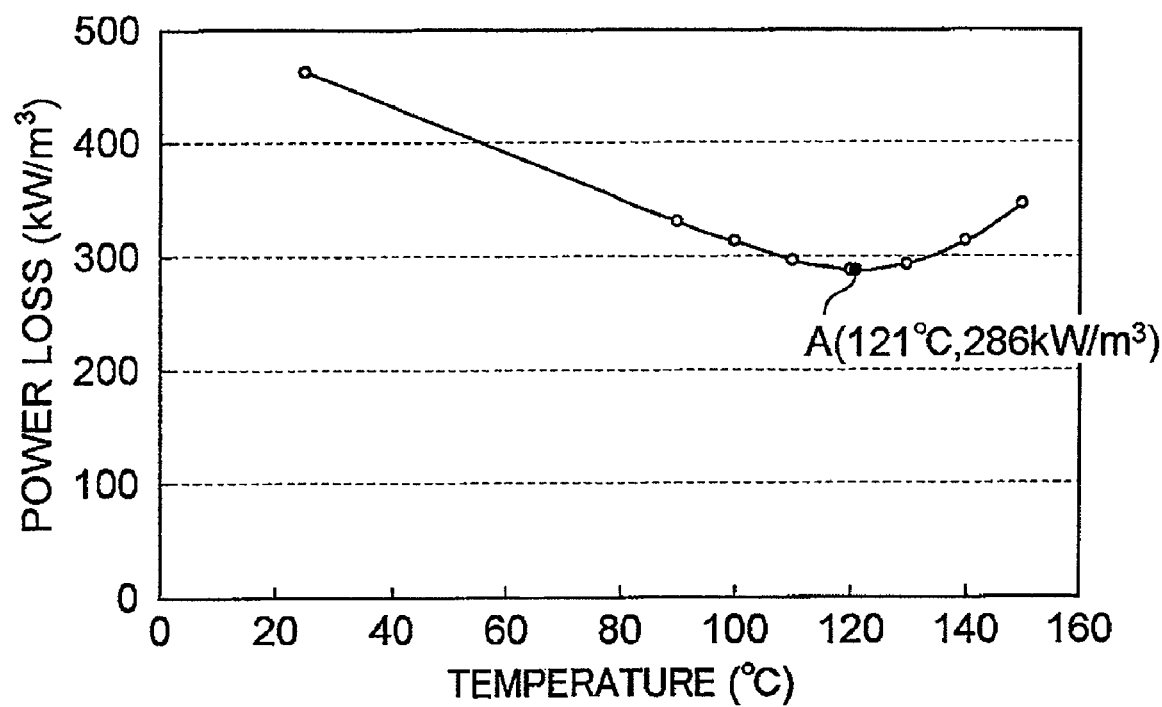
FIG. 2 is a graph showing the relationship between power loss and temperature.

The ferrite sintered body making up ferrite core 10 also has a bottom temperature higher than 120° C. and a power loss of 350 kW/m³ or less at the bottom temperature in a magnetic field with an excitation magnetic flux density of 200 mT and a frequency of 100 kHz. FIG. 2 is a graph showing the properties of the ferrite sintered body of the present invention, and illustrates one example of the relationship between power loss (core loss) and temperature (see Example 1 below). Point A in FIG. 2 is the point of minimal power loss for the ferrite sintered body, and the temperature at this point is called the bottom temperature.

Because ferrite core 10 has a bottom temperature higher than 120° C. and a power loss of 350 kW/m³ or less at the bottom temperature, heat generation can be adequately reduced even at about 100° C. or under even higher temperature conditions (such as about 110° C.), and thermal runaway can be adequately prevented. Because ferrite core 10 is highly reliable under high-temperature conditions, it can be used favorably in compact devices or in devices in which parts are packed at high densities, which are likely to have higher operating temperatures.

The reasons for making this ferrite core with such a composition are as follows.

Main Components

If the $Fe_2O_3$ component of the ferrite sintered body is less than 52 mol %, the bottom temperature of the ferrite sintered body will be excessively high, and power loss will not be sufficiently reduced at room temperature. On the other hand, if the $Fe_2O_3$ content exceeds 54 mol %, it will be difficult to achieve a bottom temperature higher than 120° C., and performance will deteriorate markedly over time during use under high temperature conditions. A $Fe_2O_3$ content of 52.8 to 53.8 mol % is especially desirable.

If the ZnO content of the ferrite sintered body is less than 6 mol % or more than 11 mol %, power loss will not be sufficient reduced at temperatures above 120° C. A ZnO content of 7.5 to 9.5 mol % is especially desirable.

Once the contents of the other main components ($Fe_2O_3$ and ZnO) have been determined, the MnO content of the fertite sintered body is determined as the remainder of the main components.

Additives

In order to more reliably prevent thermal runaway of the device, it is desirable that the power loss value at the bottom temperature be maintained as much as possible without any dramatic increase in power loss even if the bottom temperature is exceeded. Because the magnetic anisotropic constant K1 of Co is a relatively large positive value, adding a suitable amount of Co has the effect of adequately controlling the temperature dependence of power loss in the temperature range at and above the bottom temperature.

If the Co content (CoO equivalent) of the ferrite sintered body is less than $1000 \times 10^{-6}$ parts by mass per 1 part by mass of the total mass of the oxides of the main components, there will be a marked increase in power loss in the temperature range above the bottom temperature. However, if the Co content (CoO equivalent) exceeds $3500 \times 10^{-6}$ parts by mass, although the temperature variance rate of the power loss will be controlled in the temperature range above the bottom temperature, the power loss will not be sufficiently reduced. The Co content (CoO equivalent) is preferably greater than $1000 \times 10^{-6}$ parts by mass and less than $3500 \times 10^{-6}$ parts by mass, or more preferably $1500 \times 10^{-6}$ to $3000 \times 10^{-6}$ parts by mass.

Including a suitable amount of Ti in a ferrite sintered body containing Co has the effect of allowing the deterioration over time of the properties due to use in a high temperature environment to be controlled without causing an increase in power loss. If the Ti content ($TiO_2$ equivalent) of the ferrite sintered body is less than $2000 \times 10^{-6}$ parts by mass per 1 part by mass of the total mass of the oxides of the main components, there will be marked deterioration over time in performance if the sintered body is used in a high temperature environment. However, if the Ti content ($TiO_2$ equivalent)

exceeds $5000\times10^{-6}$ parts by mass, power loss will not be sufficiently reduced. The Ti content ($TiO_2$ equivalent) is preferably more than $2000\times10^{-6}$ parts by mass and less than $5000\times10^{-6}$ parts by mass, or more preferably $2500\times10^{-6}$ to $4000\times10^{-6}$ parts by mass.

Because Si has the effect of improving the sinterability of the ferrite while contributing to greater resistance of the grain boundaries, power loss can be reduced by including a suitable amount of Si. If the Si content ($SiO_2$ equivalent) of the ferrite sintered body is less than $50\times10^{-6}$ parts by mass per 1 part by mass of the total mass of the oxides of the main components, the high resistance grain boundary of the ferrite sintered body will not form properly, and power loss will not be sufficiently reduced. However, if the Si content ($SiO_2$ equivalent) exceeds $150\times10^{-6}$ parts by mass, abnormal grain growth will result, and power loss will not be sufficiently reduced. The Si content ($SiO_2$ equivalent) is preferably $70\times10^{-6}$ to $130\times10^{-6}$ parts by mass.

Like Si, Ca has the effect of increasing the degree of sintering of tie ferrite sintered body while contributing to greater resistance of the gram boundaries, and therefore power loss can be reduced by including a suitable amount of Ca. If the Ca content ($CaCO_3$ equivalent) of the ferrite sintered body is less than $300\times10^{-6}$ parts by mass per 1 part by mass of the total mass of the oxides of the main components, the high resistance layer of the ferrite sintered body will not form properly, and power loss will not be sufficiently reduced. However, if the Ca content ($CaCO_3$ equivalent) exceeds $1500\times10^{-6}$ parts by mass, abnormal grain growth will result, and power loss will not be sufficiently reduced. The Ca content ($CaCO_3$ equivalent) is preferably $350\times10^{-6}$ to $1250\times10^{-6}$ parts by mass.

The additives of the ferrite sintered body of this embodiment preferably further include Nb and/or Ta in the amounts shown in (5) and (6) below per 1 part by mass of the total mass of the oxides of the main components.
(5) Nb in an amount corresponding to $50\times10^{-6}$ to $600\times10^{-6}$ parts by mass as $Nb_2O_5$ equivalent.
(6) Ta in an amount corresponding to $80\times10^{-6}$ to $1000\times10^{-6}$ parts by mass as $Ta_2O_5$ equivalent.

Because Nb contributes to the uniformity of the crystal structure of the ferrite sintered body, power loss can be reduced by including a suitable amount of Nb. If the Nb content ($Nb_2O_5$ equivalent) of the ferrite sintered body is less than $50\times10^{-6}$ parts by mass per 1 part by mass of the total mass of the oxides of the main components, it is likely that the crystal structure will not be made sufficiently uniform, and power loss will not be sufficiently reduced. However, if the Nb content ($Nb_2O_5$ equivalent) exceeds $600\times10^{-6}$ parts by mass, it will actually tend to make the crystal structure less uniform. The Nb content ($Nb_2O_5$ equivalent) is preferably $200\times10^{-6}$ to $500\times10^{-6}$ parts by mass.

Like Nb, Ta contributes to the uniformity of the crystal structure of the ferrite sintered body, and therefore power loss can be reduced by including a suitable amount of Ta. If the Ta content ($Ta_2O_5$ equivalent) of the ferrite sintered body is less than $80\times10^{-6}$ parts by mass per 1 part by mass of the total mass of the oxides of the main components, it is likely that the crystal structure will not be made sufficiently uniform, and power loss will not be sufficiently reduced. However, if the Ta content ($Ta_2O_5$ equivalent) exceeds $1000\times10^{-6}$ the crystal structure will actually tend to be less uniform. The Ta content ($Ta_2O_5$ equivalent) is preferably $300\times10^{-6}$ to $900\times10^{-6}$ parts by mass.

When both Nb and Ta are included in the ferrite sintered body, the total content of Nb and Ta can be adjusted appropriately based on the molecular weights of $Nb_2O_5$ and $Ta_2O_5$.

In the ferrite sintered body of this embodiment, the additives preferably further include Zr and/or Hf in the amounts shown in (7) and (8) below per 1 part by mass of the total mass of the oxides of the main components.
(7) Zr in an amount corresponding to $200\times10^{-6}$ parts by mass or less as $ZrO_2$ equivalent,
(8) Hf in an amount corresponding to $400\times10^{-6}$ parts by mass or less as $HfO_2$ equivalent.

Because Zr contributes to higher resistance of the grain boundaries, including an appropriate amount of Zr is one way of reducing power loss. However, if the Zr content ($ZrO_2$ equivalent) of the ferrite sintered body exceeds $200\times10^{-6}$ parts by mass per 1 part by mass of the total mass of the oxides of the main components, an excess of high-resistance layer is likely to form in the ferrite sintered body, and power loss may not be sufficiently reduced. The Zr content ($ZrO_2$ equivalent) is preferably $50\times10^{-6}$ to $200\times10^{-6}$ parts by mass, or more preferably $80\times10^{-6}$ to $150\times10^{-6}$ parts by mass.

Like the Zr discussed above, Hf contributes to higher resistance of the grain boundaries, so power loss can be reduced by including a suitable amount of Hf. However, if the Hf content ($HfO_2$ equivalent) of the ferrite sintered body exceeds $400\times10^{-6}$ parts by mass per 1 part by mass of the total mass of the oxides of the main component, an excess of high-resistance layer is likely to form in the ferrite sintered body, and power loss may not be sufficiently reduced. The Hf content ($HfO_2$ equivalent) is preferably $80\times10^{-6}$ to $350\times10^{-6}$ parts by mass, and more preferably $130\times10^{-6}$ to $260\times10^{-6}$ parts by mass.

When both Zr and Hf are included in the ferrite sintered body, the combined content of Zr and Hf can be adjusted appropriately based on the molecular weights of $ZrO_2$ and $HfO_2$.

The ferrite sintered body of this embodiment may also have components other than the aforementioned. For example, V ($V_2O_5$) and Mo ($MoO_3$) contribute to uniformity of the crystal structure of the ferrite sintered body in the same way as Nb and Ta, and therefore including appropriate amounts of V and/or Mo is one way of reducing power loss.

Ferrite Core Manufacturing Method

Next, the method for manufacturing ferrite core 10 is explained.

First, iron oxide $\alpha$-$Fe_2O_3$, manganese oxide $Mn_3O_4$ and zinc oxide ZnO are prepared as the source materials, and these oxides are mixed to obtain a mixture. The raw materials are mixed at this time so that the respective contents of $Fe_2O_3$ and ZnO are 52 to 54 mol % and 6 to 11 mol %, with the remainder consisting mainly of $Mn_3O_4$. Other compounds may also be mixed together with these oxides at this time so that the constituent ratio of each oxide component in the final mixture is within the aforementioned range when converted to the oxide equivalent.

Next, the mixture of the main components is pre-sintered to obtain a pre-sintered powder (pre-sintering step). pre-sintering can normally be performed in air. The pre-sintering temperature is dependent on the components making up the mixture, but is preferably 800 to 1100° C. The pre-sintering time is also dependent on the components of the mixture, but is preferably 1 to 3 hours. Next, the resulting pre-sintered product is pulverized in a ball mill or the like to obtain a powder.

Meanwhile, cobalt oxide CoO, titanium oxide $TiO_2$, silicon oxide $SiO_2$ and calcium carbonate $CaCO_3$ are prepared as the additives, and specific amounts of these additives are mixed together to obtain a mixture. This mixture is added as the source materials for additives when pulverizing the pre-sintered product of the main component raw materials above, and the two are mixed together. In this way, a ferrite power is obtained for the main firing (mixing step). Additives other than those given above ($Nb_2O_5$, $Ta_2O_5$, $ZrO_2$, $HfO_2$, $V_2O_5$, $MoO_3$ and the like) can also be added at this stage. Other compounds can be used in place of the aforementioned compounds so that the contents of the additives in the final mixture are within the aforementioned ranges. Also, CaO could be used in place of $CaCO_3$, for example.

Next, a suitable binder such as polyvinyl alcohol is mixed with the ferrite power obtained as described above, which is then pressed in the same shape as ferrite core 10, or in other words in an E shape to obtain a compact body.

Figure 4:
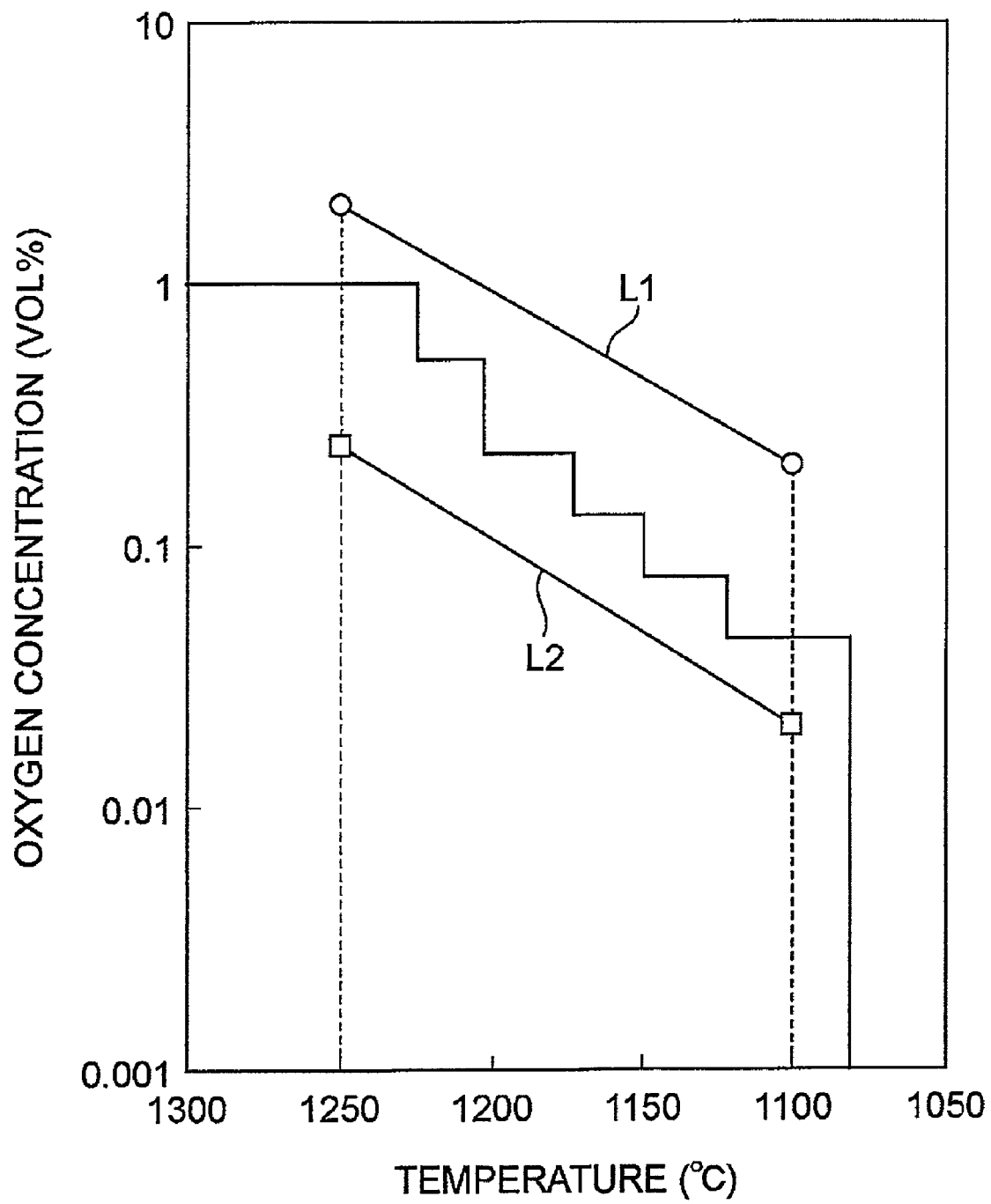
FIG. 4 is a graph showing one example of oxygen concentration settings during cool-down in the main firing step.

Next, the molded body is fired under atmospheric conditions (1 atmosphere) in a furnace (main firing step). FIG. 4 is a graph showing one example of temperature settings in the main firing step. As shown in FIG. 4, the main firing step has at least heating step S1 in which the molded body is gradually heated in the furnace, temperature holding step S2 in which the temperature is maintained at 1250 to 1345° C., slow cooling step S3 in which the temperature is gradually lowered from the holding temperature, and rapid cooling step S4 in which the temperature is rapidly lowered after the end of slow cooling step S3.

Heating step S1 is a step of raising the temperature inside the furnace to the holding temperature described below. The heating rate is preferably 10 to 300° C. per hour.

Once the specified temperature (1250 to 1345° C.) has been reached by means of heating step S1, this temperature is maintained in temperature holding step S2. If the holding temperature in temperature holding step S2 is less than 1250° C., power loss will not be sufficiently reduced due to insufficient grain growth of the ferrite sintered body and increased hysteresis loss. However, if the holding temperature exceeds 1345° C., there will be excess grain growth of the ferrite sintered body, and power loss will not be sufficiently reduced due to increased eddy-current loss. By keeping the holding temperature at 1250 to 1345° C., it is possible to balance hysteresis loss with eddy-current loss and adequately reduce power loss in the high-temperature range.

The time for firing at this holding temperature (holding) is preferably 2 hours 30 minutes or more. If the holding time is less than 2 hours 30 minutes, grain growth will be insufficient if firing is performed at 1250 to 1345° C., and power loss will probably not be sufficiently reduced. The holding time is dependent on the components of the powder, but is preferably 3 to 10 hours.

Slow cooling step S3 is performed after completion of temperature holding step S2. The slow cooling rate in slow cooling step S3 is preferably 150° C. per hour or less. If the slow cooling rate exceeds 150° C. per hour, there is likely to be more residual stress in the grains of the ferrite sintered body, and power loss probably will not be sufficiently reduced for this reason. This slow cooling rate signifies the average value within the slow cooling step, and there may be times when the temperature falls at a rate exceeding this.

When lowering the temperature from the holding temperature in slow cooling step S3, an operation is performed to control the oxygen concentration within the furnace and lower it either continuously or in stages (oxygen concentration adjustment step). By means of such an operation, the oxygen concentration at 1250° C. is made to be 0.24 to 2.0 vol % while the oxygen concentration at 1100° C. is made to be 0.020 to 0.20 vol %.

FIG. 4 is a graph showing one example of oxygen concentration settings in the furnace in slow cooling step S3. As the temperature is lowered from 1250° C. to 1100° C., the oxygen concentration in the furnace is preferably adjusted so that it moves in the region between line L1 and line L2 in FIG. 4. FIG. 4 shows the oxygen concentration set to decrease in stages. Such a stepwise decrease in oxygen concentration can be achieved by means of a stepwise decrease in the oxygen concentration of the oxygen-containing gas supplied to the furnace. The oxygen concentration can be adjusted continuously rather than in stages, or by a combination of the two. The oxygen concentration in the furnace may rise temporarily as long as it moves within the region between line L1 and line L2.

The maximum line L1 and minimum line L2 of the oxygen concentration at temperatures of 1250 to 1100° C. were calculated based on the following formula (1):

$$\mathrm{Log}(PO_2)=a-b/T \qquad (1)$$

wherein $PO_2$ is the molar ratio of oxygen (%), T is the absolute temperature (K), and a and b are each constants. The constants a and b corresponding to maximum line L1 and minimum line L2, respectively, in FIG. 4 are shown in Table 1.

TABLE 1

|  | a | b |
| --- | --- | --- |
| Maximum line L1 | 9.45 | 13941 |
| Minimum line L2 | 9.26 | 15044 |

The temperature at which slow cooling step S3 is complete and rapid, cooling step S4 begins (slow cooling end temperature) is preferably 950 to 1150° C. If the slow cooling end temperature exceeds 1150° C., there is likely to be more residual stress in the grains of the ferrite sintered body, and power loss may not be sufficiently reduced. However, if the slow cooling end temperature is lower than 950° C., hetero-phase components are likely to occur at the grain boundaries of the ferrite sintered body, and power loss may not be sufficiently reduced.

Rapid cooling step S4 is performed after completion of slow cooling step S3. It is desirable that the cooling rate be 200° C. per hour or more at least in the temperature range between the temperature at the end of the slow cooling step and 800° C. If the cooling rate in this temperature range is less than 200° C. per hour, hetero-phase components are likely to occur at the grain boundaries of the ferrite sintered body, and power loss may not be sufficiently reduced. After completion of slow cooling step S3, it is desirable from the standpoint of preventing oxidation of the ferrite that the atmosphere within the furnace be a nitrogen atmosphere (oxygen concentration 0.02 vol % or less).

The present invention is not limited by the embodiment described above. For example, in the method of manufacturing ferrite core 10 above the powder is mixed with a binder and molded before the main firing step so that ferrite core 10 can be made in the specified shape (E shape), but a ferrite core of the specified shape can also be manufactured by first main firing the powder, and then working it.

Moreover, the aforementioned embodiment is an example in which the mixed powder for main firing is prepared by adding the source materials for additives when pulverizing a pre-sintered product obtained by pre-sintering the main component materials, but this mixed powder can also be prepared as follows. For example, a mixture obtained by mixing the main component materials before pre-sintering with the source materials for additives can be pre-sintered, and the pre-sintered product can then be pulverized to obtain a mixed powder for main firing. Alternatively, a mixture obtained by mixing the main component materials before pre-sintering with the source materials for additives can be pre-sintered, and further source materials for additives and the like can then be added while pulverizing the pre-sintered product to thereby obtain a mixed power for main firing.

Figure 3:
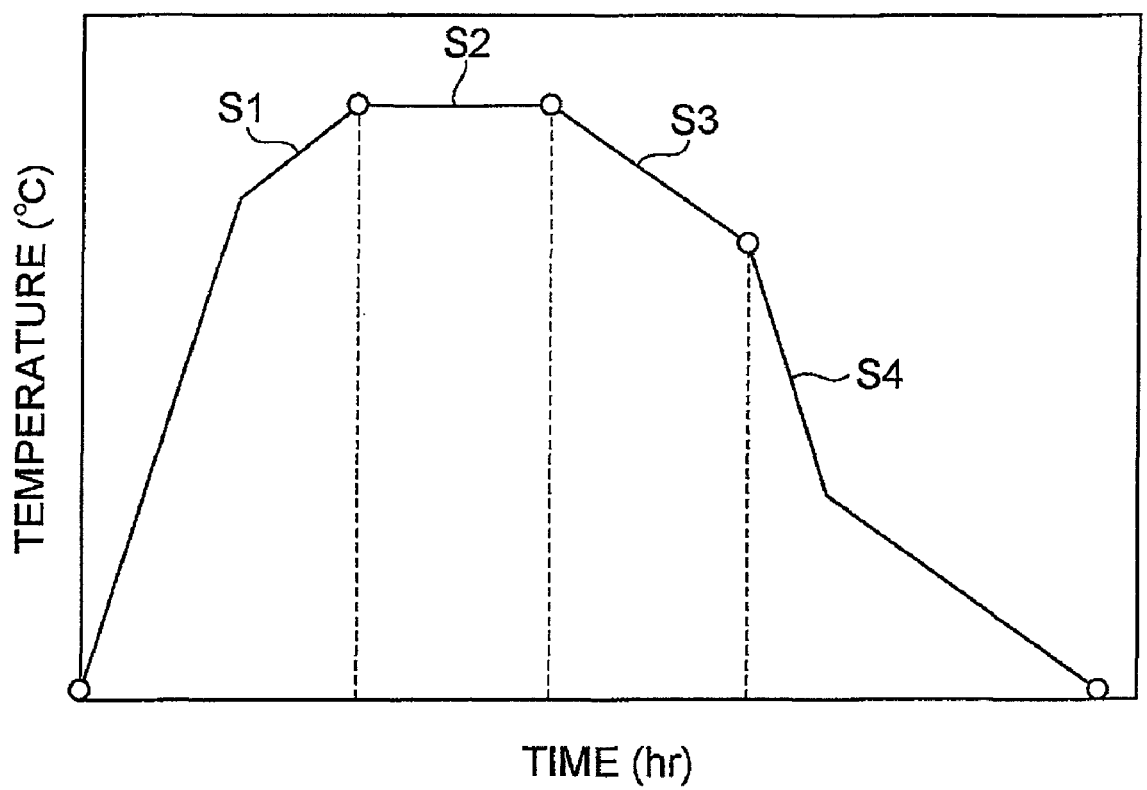
FIG. 3 is a graph showing one example of temperature settings in the main firing step.

In this embodiment, the firing profile shown in FIG. 3 is adopted for the temperature settings in the main firing step, but this is not a limitation, and appropriate changes can be made.

Moreover, while an example of an E-shaped ferrite core 10 is used in this embodiment, the shape of the ferrite core is not restricted to this. The shape of the ferrite core can be determined according to the shape and usage of the device that will contain the ferrite core.

EXAMPLES

Examples 1 to 16 and Comparative Examples 1 to 9

The various component materials were weighed so as to finally obtain the compositions shown in Table 1, and wet mixed with a ball mill. The raw material mixture was dried, and pre-sintered at a temperature of about 900° C. in air. The resulting pre-sintered powder was placed in a ball mill and wet pulverized for 3 hours to obtain the desired particle diameter.

The resulting powder was dried and then granulated after addition of 0.8 parts by mass of polyvinyl alcohol per 100 parts by mass of powder, and the obtained granule were pressed at a pressure around 100 MPa to obtain a toroidal shape compact body. The compact body was fired under the conditions shown in Table 3 to obtain the ferrite cores of Examples 1 to 16 and Comparative Examples 1 to 9, which were toroidal molded bodies with dimensions of external diameter 20 mm, internal diameter 10 mm and height 5 mm.

The power loss of each of the ferrite cores manufactured in Examples 1 to 16 and Comparative Examples 1 to 9 was measured as follows. That is, power loss was measured within a temperature range of 25 to 150° C. under conditions of excitation magnetic flux density 200 mT, frequency 100 kHz. The temperature at which the measured value of power loss was minimal within the temperature range of 25 to 150° C. (bottom temperature) was determined. The value (minimal power loss value) of power loss at the bottom temperature was also determined. FIG. 2 is a graph showing measurement results for power loss for the ferrite core of Example 1.

After power loss measurement, each ferrite core was stored for 96 hours in a thermostatic chamber set at 200° C. The power loss of each ferrite core was then measured again by the same methods. The power loss measurements before and after storage in the thermostatic chamber were then substituted in Formula (2) below to calculate the rate of change in power loss.

$$\text{Rate of change in power loss (\%)} = \frac{(\text{minimal power loss value after storage}) - (\text{minimal power loss value before storage})}{\text{minimal power loss value before storage}} \quad (2)$$

Table 2 shows measurement results for bottom temperature, minimal power loss value, power loss at 150° C. and rate of change in power loss.

TABLE 2

| | Main components (mol %) | | | Additives (ppm mass) | | | | | | | | | | Bottom temp. (° C.) | Minimal power loss (kW/ m³) | Power loss at 150° C. (kW/ m³) | Rate of change (%) |
|---|---|---|---|---|---|---|---|---|---|---|---|---|---|---|---|---|---|
| | $Fe_2O_3$ | MnO | ZnO | CoO | $TiO_2$ | $SiO_2$ | $CaCO_3$ | $Nb_2O_5$ | $Ta_2O_5$ | $ZrO_2$ | $HfO_2$ | $V_2O_5$ | $MoO_3$ | | | | |
| Ex 1 | 53.32 | 37.87 | 8.80 | 2414 | 3333 | 90 | 475 | 462 | — | 119 | — | 200 | 77 | 121 | 286 | 344 | 4.0 |
| Ex 2 | 52.53 | 36.57 | 10.90 | 3400 | 4980 | 54 | 302 | 464 | — | 194 | — | 303 | 60 | 148 | 348 | 350 | 1.0 |
| Ex 3 | 53.48 | 38.26 | 8.26 | 2369 | 2860 | 105 | 473 | 469 | — | 110 | — | 184 | 78 | 121 | 285 | 341 | 4.8 |
| Ex 4 | 53.42 | 38.29 | 8.29 | 2390 | 3330 | 103 | 1270 | 209 | — | 119 | — | 199 | 80 | 127 | 300 | 351 | 4.4 |
| Ex 5 | 53.98 | 40.00 | 6.02 | 1011 | 2100 | 103 | 1446 | 211 | — | 111 | — | 120 | 140 | 122 | 301 | 360 | 8.0 |
| Ex 6 | 53.30 | 38.20 | 8.50 | 2400 | 3000 | 90 | 475 | — | 652 | 120 | — | 201 | 71 | 131 | 295 | 340 | 3.8 |
| Ex 7 | 53.20 | 38.00 | 8.80 | 2414 | 3333 | 148 | 470 | — | 652 | 130 | — | 201 | 72 | 133 | 300 | 352 | 3.5 |
| Ex 8 | 52.80 | 36.70 | 10.50 | 3300 | 4000 | 140 | 400 | 250 | — | — | 170 | 250 | 110 | 138 | 320 | 345 | 2.1 |
| Ex 9 | 52.80 | 36.70 | 10.50 | 3288 | 3987 | 141 | 411 | 249 | — | — | 389 | 250 | 110 | 138 | 318 | 343 | 2.0 |
| Ex 10 | 53.68 | 38.32 | 8.00 | 1316 | 2001 | 103 | 1499 | 450 | — | 121 | — | 121 | 50 | 124 | 292 | 355 | 6.0 |
| Ex 11 | 53.20 | 37.35 | 9.45 | 2414 | 2810 | 85 | 475 | 455 | — | 123 | — | 350 | 70 | 129 | 292 | 343 | 3.5 |
| Ex 12 | 53.50 | 38.97 | 7.53 | 2391 | 3101 | 75 | 809 | 457 | — | 120 | — | 301 | 73 | 127 | 284 | 340 | 4.9 |
| Ex 13 | 53.33 | 37.97 | 8.70 | 2414 | 3333 | 90 | 475 | 462 | — | 11 | 173 | 198 | 75 | 121 | 284 | 343 | 4.1 |
| Ex 14 | 53.33 | 37.97 | 8.70 | 2412 | 3321 | 87 | 465 | 462 | — | 13 | 20 | 195 | 70 | 121 | 289 | 348 | 4.2 |
| Ex 15 | 53.54 | 40.43 | 6.03 | 2501 | 4965 | 89 | 465 | 460 | — | 110 | — | 200 | 76 | 122 | 294 | 349 | 5.1 |
| Ex 16 | 53.45 | 38.28 | 8.27 | 2399 | 2852 | 105 | 448 | 50 | 665 | 17 | 171 | 186 | 63 | 121 | 282 | 340 | 4.3 |
| CE1 | 54.51 | 39.51 | 5.98 | 110 | 390 | 75 | 1500 | 200 | — | 131 | — | 251 | 60 | 91 | 295 | 601 | >10 |
| CE2 | 53.80 | 39.18 | 7.02 | 500 | 1011 | 103 | 450 | 211 | — | 111 | — | 120 | 140 | 129 | 312 | 480 | >10 |
| CE3 | 51.10 | 36.70 | 12.20 | 3500 | 4500 | 80 | 311 | — | 651 | 105 | — | 252 | 50 | >150 | — | 511 | <1 |
| CE4 | 53.40 | 39.10 | 7.50 | 4532 | 2500 | 90 | 411 | 457 | — | 134 | — | 199 | 79 | 131 | 400 | 421 | 4.4 |
| CE5 | 53.30 | 39.26 | 7.44 | 2200 | 5503 | 90 | 475 | 467 | — | — | — | 203 | 80 | 122 | 370 | 440 | 4.0 |
| CE6 | 53.32 | 37.88 | 8.80 | 3420 | 3330 | 200 | 1800 | 460 | — | 120 | — | 201 | 77 | 134 | 500 | 590 | 3.9 |
| CE7 | 53.33 | 37.87 | 8.80 | 2420 | 3330 | 90 | 475 | 462 | — | 344 | — | 200 | 77 | 120 | 360 | 414 | 4.0 |
| CE8 | 53.33 | 37.87 | 8.80 | 2401 | 3300 | 99 | 466 | — | — | 121 | — | — | — | 120 | 375 | 432 | 4.3 |
| CE9 | 53.40 | 39.10 | 7.50 | 2600 | 2830 | 90 | 411 | 457 | — | — | 561 | 199 | 79 | 135 | 383 | 432 | 4.6 |

TABLE 3

| Holding temperature | 1300° C. |
|---|---|
| Holding time | 5 hr |
| Slow cooling rate | 30° C./hr |
| Oxygen concentrations  1250° C. | 1.24 vol % |
| in slow cooling step     1100° C. | 0.11 vol % |
| Temperature at end of slow cooling | 1000° C. |
| Cooling rate during rapid cooling (to 800° C.) | 300° C./hr |

Examples 17 to 25 and Comparative Examples 10 to 18

The ferrite cores of Examples 17 to 25 and Comparative Examples 10 to 18 were manufactured as in Example 1 except that main firing was performed under the conditions shown in Table 4 rather than the conditions shown in Table 3, and the evaluation tests described above were performed. Table 4 shows measurement results for bottom temperature, minimal power loss value, power loss at 150° C. and rate of change in power loss.

TABLE 4

| | Holding temp. (° C.) | Holding time (hr) | Slow cooling rate (° C./hr) | Oxygen concentration (vol %) | | Temp. at end of holding time (° C.) | Rapid cooling rate (° C./hr) | Bottom temp. (° C.) | Minimal power loss (kW/m³) | Power loss at 150° C. (kW/m³) | Rate of change (%) |
|---|---|---|---|---|---|---|---|---|---|---|---|
| | | | | 1250° C. | 1100° C. | | | | | | |
| Ex 1 | 1300 | 5 | 30 | 1.24 | 0.11 | 1000 | 300 | 121 | 286 | 344 | 4.0 |
| Ex 17 | 1340 | 5 | 30 | 1.24 | 0.11 | 1000 | 300 | 121 | 336 | 396 | 3.6 |
| Ex 18 | 1255 | 5 | 30 | 1.24 | 0.11 | 1000 | 300 | 121 | 320 | 369 | 4.5 |
| Ex 19 | 1300 | 3 | 30 | 1.24 | 0.11 | 1000 | 300 | 121 | 340 | 398 | 4.0 |
| Ex 20 | 1300 | 5 | 100 | 1.24 | 0.11 | 1000 | 300 | 121 | 345 | 401 | 4.1 |
| Ex 21 | 1300 | 5 | 30 | 1.24 | 0.11 | 1100 | 300 | 121 | 293 | 350 | 4.1 |
| Ex 22 | 1300 | 5 | 30 | 1.24 | 0.11 | 950 | 300 | 121 | 345 | 402 | 4.2 |
| Ex 23 | 1300 | 5 | 30 | 2.00 | 0.20 | 1000 | 300 | 121 | 283 | 340 | 7.0 |
| Ex 24 | 1300 | 5 | 30 | 0.30 | 0.03 | 1000 | 300 | 125 | 343 | 400 | 2.3 |
| Ex 25 | 1300 | 5 | 30 | 1.24 | 0.11 | 1000 | 200 | 121 | 330 | 390 | 4.0 |
| CE 10 | 1360 | 5 | 30 | 1.24 | 0.11 | 1000 | 300 | 121 | 390 | 455 | 3.4 |
| CE 11 | 1200 | 5 | 30 | 1.24 | 0.11 | 1000 | 300 | 121 | 380 | 430 | 4.7 |
| CE 12 | 1300 | 2 | 30 | 1.24 | 0.11 | 1000 | 300 | 121 | 356 | 413 | 4.0 |
| CE 13 | 1300 | 5 | 150 | 1.24 | 0.11 | 1000 | 300 | 121 | 400 | 460 | 4.1 |
| CE 14 | 1300 | 5 | 30 | 1.24 | 0.11 | 1200 | 300 | 121 | 360 | 450 | 4.1 |
| CE 15 | 1300 | 5 | 30 | 1.24 | 0.11 | 850 | 300 | 121 | 450 | 520 | 4.0 |
| CE 16 | 1300 | 5 | 30 | 2.40 | 0.30 | 1000 | 300 | 115 | 280 | 340 | >10 |
| CE 17 | 1300 | 5 | 30 | 0.10 | 0.01 | 1000 | 300 | 125 | 375 | 435 | 2.0 |
| CE 18 | 1300 | 5 | 30 | 1.24 | 0.11 | 1000 | 100 | 121 | 370 | 430 | 4.1 |

It is clear from the results shown in Tables 2 and 4 that it is possible to manufacture a ferrite sintered body with a bottom temperature higher than 120° C. and sufficiently low power loss at the bottom temperature by giving the ferrite sintered body a specific composition and controlling the main firing conditions. Moreover, it is clear that a ferrite sintered body manufactured in this way can maintain a sufficiently low power loss value even when used long-term under high-temperature conditions, with little deterioration of performance over time.

It has thus been confirmed that because it has such properties, the ferrite sintered body of the present invention is sufficiently resistant to thermal runaway, and can be used favorably as a magnetic core.

What is claimed is:

1. A ferrite sintered body containing:

main components consisting of 52 to 54 mol % $Fe_2O_3$, 35 to 42 mol % MnO and 6 to 11 mol % ZnO as oxide equivalents; and additives including $1000 \times 10^{-6}$ to $3500 \times 10^{-6}$ parts by mass Co as CoO equivalent, $2100 \times 10^{-6}$ to $5000 \times 10^{-6}$ parts by mass Ti as $TiO_2$ equivalent, $50 \times 10^{-6}$ to $150 \times 10^{-6}$ parts by mass Si as $SiO_2$ equivalent and $300 \times 10^{-6}$ to $1500 \times 10^{-6}$ parts by mass Ca as $CaCO_3$ equivalent per 1 part by mass of the total mass of said oxides of said main components, wherein the temperature at which power loss is a minimal value is higher than 120° C. in a magnetic field with an excitation magnetic flux density of 200 mT and a frequency of 100 kHz, and the power loss at said temperature at which power loss is a minimal value is 350 kW/m³ or less.

2. The ferrite sintered body according to claim 1, wherein said additives further include $50 \times 10^{-6}$ to $600 \times 10^{-6}$ parts by mass of Nb as $Nb_2O_5$ equivalent and/or $80 \times 10^{-6}$ to $1000 \times 10^{-6}$ parts by mass of Ta as $Ta_2O_5$ equivalent per 1 part by mass of the total mass of said oxides of said main components.

3. The ferrite sintered body according to claim 1, wherein said additives further include $200 \times 10^{-6}$ parts by mass or less of Zr as $ZrO_2$ equivalent and/or $400 \times 10^{-6}$ parts by mass or less of Hf as $HfO_2$ equivalent per 1 part by mass of the total mass of said oxides of said main components.

4. The ferrite sintered body according to claim 2, wherein said additives further include $200 \times 10^{-6}$ parts by mass or less of Zr as $ZrO_2$ equivalent and/or $400 \times 10^{-6}$ parts by mass or less of Hf as $HfO_2$ equivalent per 1 part by mass of the total mass of said oxides of said main components.

5. A method for manufacturing a ferrite sintered body, comprising:

a mixing step of mixing main components consisting of 52 to 54 mol % $Fe_2O_3$, 35 to 42 mol % MnO and 6 to 11 mol % ZnO as oxide equivalents with additives including $1000 \times 10^{-6}$ to $3500 \times 10^{-6}$ parts by mass Co as CoO equivalent, $2000 \times 10^{-6}$ to $5000 \times 10^{-6}$ parts by mass Ti as $TiO_2$ equivalent, $50 \times 10^{-6}$ to $150 \times 10^{-6}$ parts by mass Si as $SiO_2$ equivalent and $300 \times 10^{-6}$ to $1500 \times 10^{-6}$ parts by mass Ca as $CaCO_3$ equivalent per 1 part by mass of the total mass of said oxides of said main components; and a main firing step of sintering a mixed powder containing said main components and said additives in a furnace to obtain a ferrite sintered body, wherein said main firing step has a temperature holding step of maintaining the firing temperature at 1250 to 1345° C., and an oxygen concentration adjustment step of reducing the oxygen concentration inside said furnace either continuously or in stages when lowering the temperature from the holding temperature, so that by means of said oxygen concentration adjustment step, the oxygen concentration at 1250° is made to be 0.24 to 2.0 vol % while the oxygen concentration at 1100° is made to be 0.020 to 0.20 vol %.

* * * * *